Patented Aug. 31, 1954

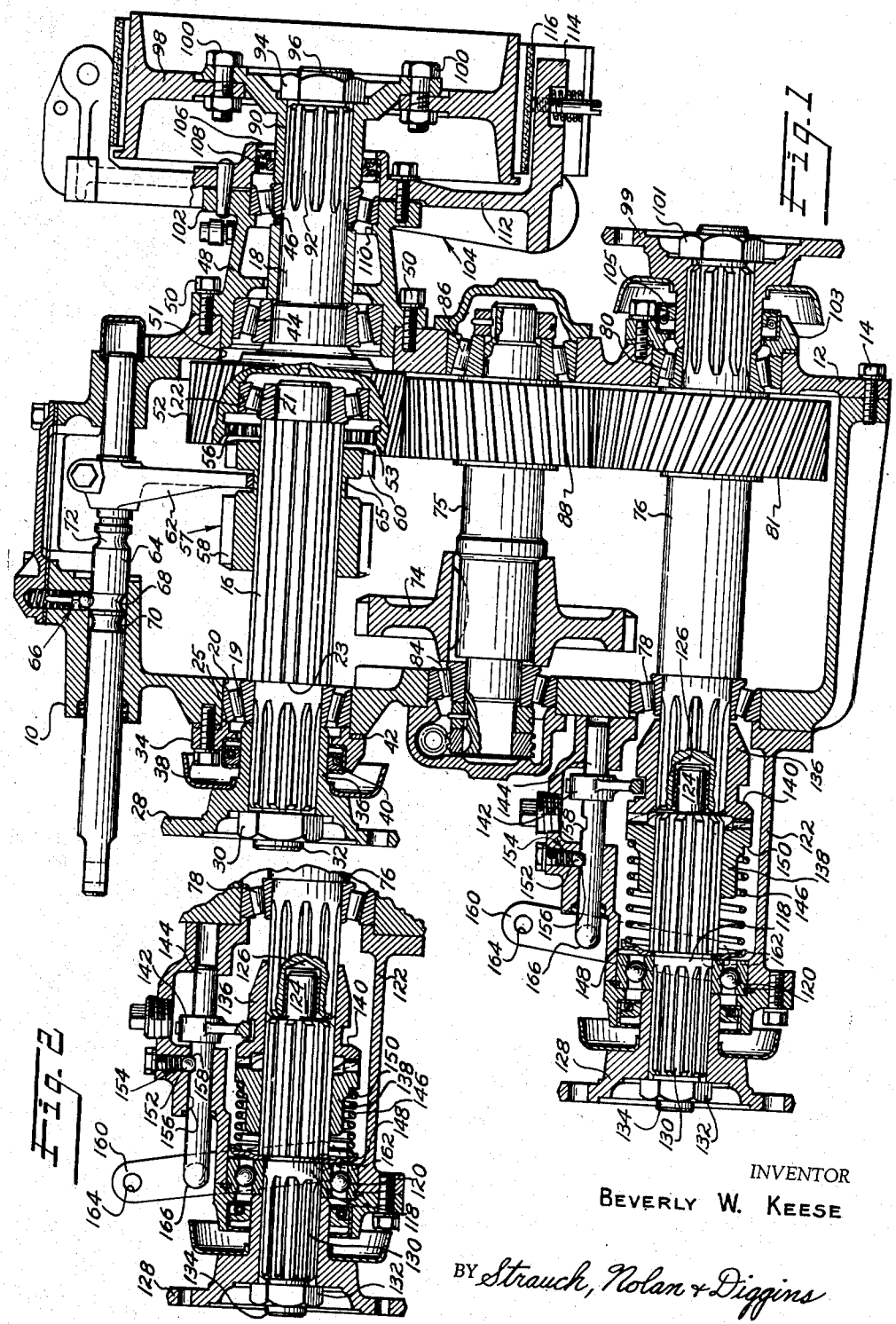

2,687,656

UNITED STATES PATENT OFFICE 2,687,656

DRIVE MECHANISM

Beverly W. Keese, Oshkosh, Wis., assignor, by mesne assignments, to Rockwell Spring and Axle Company, Coraopolis, Pa., a corporation of Pennsylvania Application January 4, 1951, Serial No. 204,435

8 Claims. (Cl. 74—665)

This invention relates in general to drive mechanism in motor vehicles provided with multiple drive axles, and more particularly to improvement in the mechanism of the drive assembly known as the transfer case in such vehicles.

An example of a multiple drive axle vehicle to which the present invention is applicable is that disclosed in United States Letters Patent No. 2,449,546 issued September 21, 1948 to L. R. Buckendale et al. for "Power Transmitting Mechanism." The transfer case assembly of the present invention is adaptable for use for example with multiple drive axle vehicles known commercially as 6 x 6 or with those known commercially as 4 x 4.

Multiple drive axle motor vehicles of the type disclosed in the Buckendale et al. patent are generally provided with engine power transmission mechanism by means of which both the front and rear vehicle ground wheels may be positively driven at substantially uniform peripheral speed. Since the peripheral speed of the front wheels at times tends to be greater than that of the rear wheels, as for example when the vehicle is turning a curve, in order to prevent excessive tire wear the transmission mechanism may be provided with means for automatically decoupling the front wheels from their drive under such conditions to permit their rotation at whatever speed may be demanded by their frictional contact with the road.

Certain mechanisms have been developed in the past which are adapted to permit the front wheels to overrun their drive when their frictional contact with the road causes them to rotate at a greater peripheral speed than that of the rear wheels. An example of such prior art mechanisms is that disclosed in United States Letters Patent No. 2,105,918 issued January 18, 1938 to A. W. Herrington for "4-Wheel Drive Vehicle." In a device such as that disclosed in the Herrington patent, no provision is made for establishing a positive drive connection to the front wheels if desired, and it has been found that in field operation of vehicles of this type conditions arise when it is essential for the operator to be able to establish at will a positive drive to all wheels.

It is accordingly a primary object of this invention to provide a transfer case assembly for a multiple drive axle vehicle having means optionally operable to establish a positive drive connection to the front wheels or a unidirectional drive connection by which the front wheels may overrun their drive.

More specifically it is an object of this invention to provide a transfer case assembly for a multiple drive axle vehicle having a pair of coacting unidirectional clutch elements one of which is adapted for rotation with an output shaft and the other of which is driven from the power input shaft of the assembly and wherein said clutch elements are actuatable to alternatively establish a positive drive connection from the input shaft to the output shaft.

It is a further specific object of this invention to provide a transfer case assembly for a multiple drive axle vehicle having drive mechanism including coaxially aligned front and rear axle drive shafts, and a pair of coacting unidirectional clutch elements each fixed for rotation with one of said drive shafts and adapted in one position to transmit unidirectional torque from the rear to the front power output shaft and wherein one of said clutch elements is movable axially relative to said shafts to a position to establish a solid drive connection therebetween.

These and other objects of this invention will become apparent as the description proceeds in connection with the accompanying drawings wherein like reference numerals have been used to designate like parts and wherein:

Figure 1 is a sectional view through the transfer case assembly of this invention illustrating the arrangement of the mechanism therein when adapted to establish a positive drive connection to one drive axle and a unidirectional drive connection to another drive axle; and Figure 2 is a fragmentary sectional view of a portion of the transfer case mechanism illustrating the other position of the clutch when adapted to establish a positive two-way drive connection to the front drive axle.

Referring now to Figure 1, the transfer case assembly is enclosed in a suitable housing 10 which is open at its rear end, and a rear cover plate 12 is secured to housing 10 over the open end as by bolts 14. A pair of coaxially aligned shafts 16 and 18 are journalled for rotation relative to the housing structure of the transfer case assembly. Shaft 16, which is the power input shaft for the transfer case assembly and driven from the vehicle engine is journalled at its forward end by an anti-friction bearing 19 mounted within an aperture 20 in the front wall of housing 10. The rear end of shaft 16 is supported in a tapered roller bearing 21 whose ner race is fixed upon the rear end of shaft 16 and whose outer race is fixed within a cup-shaped recess 22 formed within the enlarged forward end of shaft 18.

A flange 28 is suitably fixed to power input shaft 16 forwardly of bearing 19, being splined for rotation with shaft 16 and axially fixed to shaft 16 as by a nut 30 threadedly engaging its reduced forward end 32. Flange 28 is adapted for suitable connection through universal joints and an intermediate propeller shaft to the power output shaft of a conventional variable speed transmission driven from a vehicle prime mover such as an internal combustion engine to receive driving torque therefrom. Bearing 19 has its inner race in abutment with a shoulder 23 on shaft 16 and its outer race abutted by an annular shoulder 25 of a cover plate 34 surrounding the hub 36 of flange 28 and fixed to the housing 10 by bolts 38. A suitable oil seal 40 and a gasket 42 are provided to prevent leakage of lubricant from the interior of the housing 10 through the aperture 20.

Shaft 18 is suitably journalled by anti-friction bearings 44 and 46 within an auxiliary housing 48 which is secured as by bolts 50 to the rear of the cover plate 12, the portion of housing 48 which surrounds bearing 44 being piloted within cover plate aperture 51. The enlarged forward end of output shaft 18 is formed with external teeth providing a gear 52. Forwardly of recess 22, gear 52 is formed with a larger diameter recess 53 wherein an annular internal gear or toothed clutch 56 is provided.

A gear cluster 57, which is formed with spaced spur gears 58 and 60, is internally splined for axial sliding movement along the externally splined portion of the power input shaft 16 between the bearings 19 and 21. The axial position of gear cluster 57 is controlled by a shifter fork 62 fixed to a shift rail 64 and which engages an annular recess 65 between gears 58 and 60. Shift rail 64, which is mounted for longitudinal movement through aligned apertures in the front and rear walls of housing 10, may be shifted to one of three positions: its illustrated neutral position of Figure 1 in which spring loaded ball detent 66 is engaged in recess 68 as shown, its high speed position in which ball detent 66 engages recess 70, and its low speed position in which ball detent 66 engages recess 72. When shift rail 64 is moved to its high speed position, gear cluster 57 is shifted along the splined portion of input shaft 16 to the right to a position in which the teeth of gear 60 mesh or clutch with the internal teeth 56 of gear 52. When shift rail 64 is moved to its low speed position, gear cluster 57 is shifted to the left along the splined portion of input shaft 16 to a position in which gear 58 is in mesh with a gear 74 on the intermediate shaft 75 as will appear.

A power output shaft 76 is journalled for rotation within transfer case housing 10 about an axis parallel to that of power input shaft 16 by anti-friction bearings 78 and 80 which are mounted respectively within aligned apertures in the front wall of housing 10 and cover plate 12. A gear 81 of the same size as gear 52 is fixed to power output shaft 76 within the housing 10 forwardly of bearing 80. Intermediate shaft 75 is journalled for rotation within housing 10 by anti-friction bearings 84 and 86 which are mounted in aligned apertures within the front wall of housing 10 and within rear cover plate 12 respectively, the axis of shaft 75 being parallel to that of shaft 16. Gear 74 is keyed to shaft 75 adjacent bearing 84, and a second gear 88 is suitably fixed to shaft 75 adjacent bearing 86. Gear 88 is in constant mesh with gears 52 and 81.

Thus, depending upon the shifted position of gear cluster 57 as controlled by the shift rail 64, power is transmitted from the power input shaft 16 to the output shaft 76 either at a low ratio through gears 58 and 74, shaft 75, and gears 88 and 81; or at a higher ratio through the clutch comprising gear 60 and internal gear 56, and gears 52, 88 and 81.

A conventional auxiliary brake assembly is mounted upon auxiliary housing 48 for retarding the rotation of shaft 18 and consequently the entire driven mechanism of the transfer case assembly when necessary. An internally splined coupling flange 90 is splined onto the rear end of shaft 18 at 92 and fixed thereto as by a nut 94 threadedly engaging the reduced threaded end 96 of shaft 18. A brake drum 98 is secured as by bolts 100 to flange 90. Housing 48 is provided toward its rear end with a radial flange 102 to which is secured an auxiliary brake support plate 104. Plate 104, which is formed with an aperture 106 for holding the rear oil seal 108, serves as a cover for the rear aperture 110 in the housing 48 through which shaft 18 extends, and is formed with a radially extending section 112 that terminates in a shelf 114 serving as a support for the brake actuating mechanism (not shown) and the brake shoes and lining 116.

A coupling flange 99 is splined on the rear end of shaft 76 and secured there by nut 101. A cap 103 serves as a retainer for bearing 80 and an oil seal 105 is provided between cap 103 and flange 99.

Coupling flanges 90 and 99 are adapted to be connected through suitable propeller shaft assemblies to tandem drive axles at the rear of the vehicle.

Power is supplied to the front drive axle from a front power output shaft 118 journalled at its forward end by an anti-friction bearing 120 within an auxiliary housing 122 in coaxial alignment with the power output shaft 76. Housing 122 is suitably secured to housing 10 and a reduced rear end portion 124 of shaft 118 is piloted within a recess 126 in the forward end of shaft 76 to maintain the coaxial alignment of shafts 118 and 76. A coupling flange 128, the hub of which is internally splined and in tight engagement with the externally spline forward portion 130 of shaft 118, is axially fixed on shaft 118 by a nut 132 threadedly engaging the reduced threaded extension 134 of shaft 118 and is adapted for connection to a suitable propeller shaft assembly to drive the front dirigible axle of the vehicle.

Power is transmitted from shaft 76 to shaft 118 through a pair of coacting clutch elements 136 and 138 which are slidably splined respectively on the forward end of output shaft 76 outwardly of bearing 78 and on the rear end of shaft 118. The adjacent faces of clutch elements 136 and 138 are each formed with an annular row of oppositely directed ratchet type clutch teeth forming a unidirectional drive connection between shaft 76 and shaft 118.

Clutch element 136 is formed with a peripheral recess 140 engaged by a shifter fork 142 fixed to a slidable shift rail 144. The axial position of clutch element 136 is thus positively selected and determined by the position of shift rail 144. A compression spring 146 surrounds shaft 118 and a portion of clutch element 138 and abuts at one end against a retainer plate 148 which seats against the inner race of anti-friction bearing 120. The other end of spring 146 abuts against an annular shoulder 150 on clutch element 138. Spring 146 thus resiliently holds the two clutch elements 136 and 138 in engagement, and permits forward displacement of clutch element 138 along shaft 118 during ratchet action.

When clutch element 136 is in the position shown in Figure 1, so long as the front axle drive shaft 118 tends to rotate at a speed equal to or less than that of shaft 76 due to the frictional engagement of the front wheels with the road, a driving connection is maintained between clutch elements 136 and 138. The ratchet teeth are so directed. If, due to the increased speed of the front wheels in rounding a curve for example, shaft 118 tends to rotate at a speed greater than that of shaft 76, slippage will occur between the coacting teeth of clutch elements 136 and 138, clutch element 138 moving forwardly against the force of compression spring 146 due to the camming action between the coacting ratchet type clutch teeth.

When shaft 76 is driven in the opposite direction for reverse travel of the vehicle, due to the unidirectional clutch drive there is no tendency to drive the shaft 118 from the shaft 76, the speed of rotation of shaft 118 being determined entirely by drive from the front axle due to the frictional contact of the front wheels with the ground. If when the vehicle is moving in a reverse direction the frictional contact with the road tends to drive the shaft 118 from the front axle at a speed greater than that at which shaft 76 is driven from the vehicle transmission, shaft 118 may tend to drive shaft 76. This, of course, will produce some braking tendency upon the front wheels, but, since this condition occurs infrequently, and from very short distances of vehicle travel, no substantial undesirable wear of the tires results.

Shift rail 144 is mounted for longitudinal movement in a pair of aligned apertures formed in the auxiliary housing 122 along an axis parallel to that of shafts 118 and 76, its longitudinal position being maintained by the engagement of a ball 152 of a ball detent assembly 154 engaging in one of a pair of recesses 156 and 158 in the surface of the shift rail 144. A shift lever 160, which is pivoted on a fixed pin 162 extending from the reverse side of the housing 122 and which is provided with an aperture 164 at its opposite end for suitable connection to a conventional transmission shift linkage, is connected at 166 to the shift rail 144 so that shift rail 144 may be moved between its two positions by moving lever 160.

The normal position of lever 160 and clutch elements 136 and 138 is that shown in Figure 1, while their shifted position is that shown in Figure 2. When shift rail 144 is moved to its forward position as shown in Figure 2, shift fork 142 and clutch elements 136 and 138 are also shifted forwardly as a unit, this axial displacement of the clutch being permitted by spring 146 which is compressed almost solid as in Figure 2. When clutch element 136 is in this forward position, its internal spline teeth bridge the external spline teeth of both shafts 76 and 118 to thus establish a positive drive connection between shaft 76 and shaft 118. This shift position locks out the unidirectional drive to the front axle and substitutes a positive drive such as is equivalent to that encountered in the usual front axle drive vehicle.

Thus, according to the invention, power is delivered from an engine through a vehicle transmission to the power input shaft 16 of the transfer case assembly through a suitable propeller shaft and universal coupling connected to the flange member 28. The transfer case assembly gear mechanism is in its neutral position when gear cluster 57 is in the position shown in Figure 1. By means of a suitable shifting mechanism, shift rail 64 may be moved to the left to move gear 58 into mesh with gear 74 on intermediate shaft 75. This provides for a low range of speeds of the vehicle axles, the drive train being from input shaft 16 through gears 58 and 74, intermediate shaft 75, gears 88, 52 and shaft 18 and gears 88, 81 and shaft 76 to the rear axles and shaft 118 to the front axle. When shift rail 64 is moved to the right to bring gear 60 into mesh with the internal gear 56, power is transmitted from shaft 16 through gear 60, internal gear teeth 56, gears 52, 88, and 81 to shaft 76. In this position a higher range of speed of the output shafts are available.

Under normal forward drive conditions, power is transmitted from shaft 76 through the unidirectional coacting clutch elements 136 and 138 to front axle drive shaft 118, only when the speed of shaft 76 is equal to or greater than the speed at which shaft 118 tends to rotate due to frictional contact of the front wheels with the ground. In normal reverse drive, no power is transmitted from shaft 76 to shaft 118.

When it is desired to transmit power to the front axle positively at all times and in both in the directions of vehicle travel, shifting of clutch element 136 forward into its Figure 2 position, in which its internal spline teeth engage the external teeth on both shafts 76 and 118 to act as solid coupling between shaft 76 and 118 is accomplished. Clutch element 136 thus performs a dual function, it is one element of a unidirectional clutch assembly and it is a coupling element adapted to establish a solid two-way drive connection. Since clutch element 136 performs this dual function, the mechanism of this invention is more economical to manufacture and more simple in operation than prior art devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a transfer case assembly for a multiple drive axle vehicle, housing structure therefor, a power input shaft and first and second coaxially aligned power output shafts journalled for rotation in said housing structure, the adjacent ends of said aligned first and second power output shafts being provided with like external splines, a drive train interconnecting said input shaft with said first output shaft, first and second coacting uni-directional clutch elements formed with interlocking complementary ratchet teeth and each having internal splines complementary to the external splines on said output shafts by which said clutch elements are splined respectively to the adjacent end portions of said first and second output shafts, and resilient means for holding said clutch elements in engagement by resisting relative axial movement therebetween, and means for shifting one of said clutch elements axially of its shaft to a position such that its internal splines engage the external splines of both of said output shafts to form a positive drive connection between said output shafts.

2. In a drive assembly, aligned coaxial relatively rotatable shafts having similarly externally splined adjacent ends, clutch elements having coacting unidirectional drive teeth and like internal splines complentary to those of said shafts whereby said elements are slidably mounted on said respective shaft ends, a spring urging said clutch elements into operative engagement, said spring permitting axial separation of said clutch elements to declutch the drive during relative rotation of said shafts, and means for shifting the clutch elements along said shafts against the force of said spring to bridge the internal splines of one of said clutch elements across said splined shaft ends to establish a solid two-way drive connection between said shafts.

3. In a transfer case assembly, power input, intermediate, and first power output shafts journalled for rotation within a housing about spaced parallel axes, a pair of spaced gears fixed to said intermediate shaft, and a gear fixed to said first output shaft in constant mesh with one of said intermediate shaft gears, a pair of gear members mounted on said power input shaft alternatively operable to drive said intermediate shaft through one of said intermediate shaft gears, a second power output shaft journalled for rotation relative to said housing in coaxial alignment with said first power output shaft, the adjacent end of said shafts being formed with like external splines, a uni-directional clutch comprising engaged first and second unidirectional clutch elements each provided with internal splines complementary to and respectively engaged with the external splines of said first and second power output shafts, said clutch being operable to transmit uni-directional torque from said first to said second power output shaft, and means for shifting said uni-directional drive coupling to establish a direct drive connection between said output shafts by engaging the internal splines of one of said clutch elements with the external splines of both of said power output shafts.

4. In a transfer case assembly, power input, intermediate, and first power output shafts journalled for rotation within a housing about spaced parallel axes, a pair of spaced gears fixed to said intermediate shaft, and a gear fixed to said first output shaft in constant mesh with one of said intermediate shaft gears, a pair of gear members mounted on said power input shaft alternatively operable to drive said intermediate shaft through one of said intermediate shaft gears, a second power output shaft journalled for rotation relative to said housing in coaxial alignment with said first power output shaft, the adjacent ends of said shafts being formed with like external splines and a uni-directional clutch for transmitting uni-directional torque from the first to the second power output shaft comprising a pair of engaged clutch elements each formed with like internal splines complementary to the external splines of said output shafts whereby one is normally fixed for rotation with each of said output shafts and said elements are mounted for axial movement relative thereto, one of said clutch elements being adapted to establish a direct drive coupling between said output shaft upon axial movement thereof by the simultaneous engagement of its internal splines with the external splines of both of said shafts.

5. In a transfer case assembly, power input, intermediate, and first power output shafts journalled for rotation within a housing about spaced parallel axes, a pair of spaced gears fixed to said intermediate shaft, and a gear fixed to said first output shaft in constant mesh with one of said intermediate shaft gears, a pair of gear members mounted on said power input shaft alternatively operable to drive said intermediate shaft through one of said intermediate shaft gears, a second power output shaft journalled for rotation relative to said housing in coaxial alignment with said first power output shaft, a uni-directional clutch for transmitting uni-directional torque from the first to the second of said power output shafts comprising a pair of coacting clutch elements formed with oppositely directed engaged ratchet teeth, one of said clutch elements surrounding and being splined to each of said output shafts, and means for shifting said clutch elements axially of said output shafts to a position in which the internal spline teeth of one clutch element engages the external spline teeth of both of said output shafts to establish a direct drive connection therebetween.

6. In a transfer case assembly, a drive shaft, a driven shaft, a uni-directional clutch for transmitting uni-directional torque from said drive shaft to said driven shaft comprising a pair of coacting clutch elements formed with oppositely directed engaged ratchet teeth, one of said clutch elements surrounding and being splined to each of said shafts, and means for shifting said clutch elements axially of said shafts to a position in which the internal spline teeth of one clutch element engage the external spline teeth of both of said shafts to establish a direct drive connection therebetween.

7. In a drive assembly, coaxial shafts having adjacent similarly externally splined ends, a first clutch element slidable on the splined end of one shaft, a second clutch element slidable on the splined end of the other shaft, a spring reacting on said second clutch element to urge said clutch elements into engagement, the engaged faces of said clutch elements being formed with uni-directional torque transmitting teeth, and means operatively connected to said first clutch element for axially shifting said first clutch element to a position in which its internal splines bridge and solidly drive-connect the external splines of the adjacent ends of said shafts, said second clutch element being displaced against the force of said spring during said axial shift of the first clutch element.

8. In a transfer case assembly, a housing, a first shaft journaled in opposite walls of said housing and projecting rearwardly therefrom for connection to a rear axle drive mechanism, a front axle drive mechanism, a front axle drive shaft journaled at its front end in said housing and having its other end rotatably piloted in the adjacent end of said first shaft, and a one way drive coupling assembly slidably and non-rotatably mounted on said shaft, said coupling comprising separable but normally meshed clutch elements, and means for shifting said clutch assembly as a unit between a first position where said meshed clutch elements are operatively connected only to the respective shafts whereby the front wheels may overrun the drive from said first shaft, and a second position where one of said clutch elements locks said shafts for rotation together.

References Cited in the file of this patent

UNITED STATES PATENTS

| Number | Name | Date |
|---|---|---|
| 779,713 | Kemp | Jan. 10, 1905 |
| 1,961,326 | Barnes | June 5, 1934 |
| 2,072,058 | Rauen | Feb. 23, 1937 |
| 2,085,322 | Lapsley | June 29, 1937 |
| 2,107,072 | Herrington | Feb. 1, 1938 |
| 2,299,373 | Bergstrom | Oct. 20, 1942 |
| 2,344,388 | Bixby | Mar. 14, 1944 |
| 2,354,300 | Bock | July 25, 1944 |
| 2,399,201 | Buckendale | Apr. 30, 1946 |
| 2,415,758 | Peterson | Feb. 11, 1947 |
| 2,443,597 | Carnagua | June 22, 1948 |